Feb. 13, 1923.
A. ASPER
1,445,263
COMBINED BOARD SETTING AND WRECKING LEVER
Filed Mar. 6, 1920
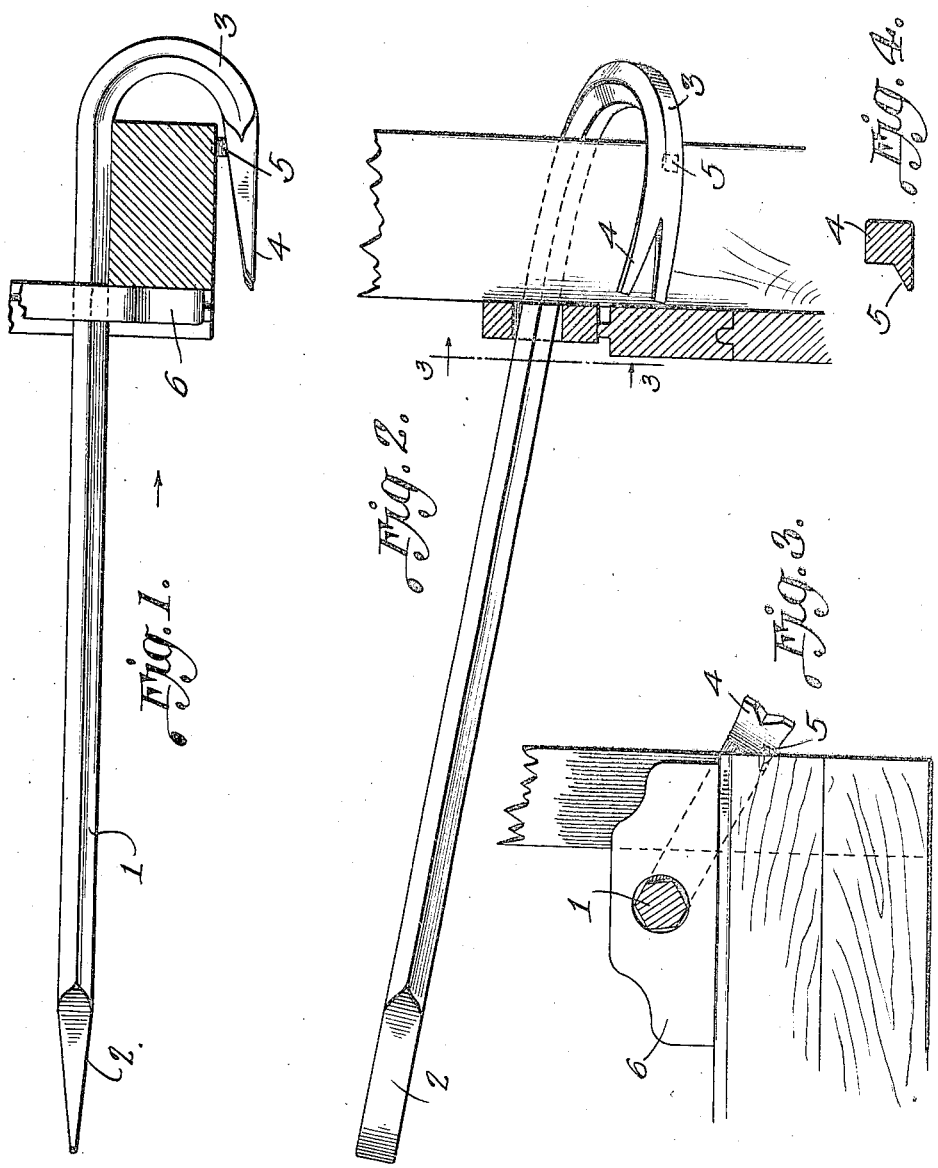
INVENTOR.
Albert Asper,
BY
Paul & Paul
ATTORNEYS.

Patented Feb. 13, 1923.

1,445,263

UNITED STATES PATENT OFFICE.

ALBERT ASPER, OF PARSHALL, NORTH DAKOTA.

COMBINED BOARD-SETTING AND WRECKING LEVER.

Application filed March 6, 1920. Serial No. 363,673.

*To all whom it may concern:*

Be it known that I, ALBERT ASPER, citizen of the United States, residing at Parshall, in the county of Mountrail and State of North Dakota, have invented certain new and useful Improvements in Combined Board-Setting and Wrecking Levers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a tool specially adapted for use in wrecking buildings and also for setting flooring, drop-siding, and sheathing of buildings. It has for its purpose to construct such a tool having one end of the bar lever so formed that the lever may be used as a crow-bar, and the other end formed with a hook and forked claw that it adapts the bar for uses where a hook and claw are desirable, and also in which the bar will carry a setting block adapted to bear against the edge of a piece of flooring or sheathing and the hook end formed with a stud or spur to penetrate a post or joist and serve as a fulcrum for the bar lever so that the latter may stand at an angle or obliquely to the direction of the application of power so as to afford greater leverage to the lever-bar in operation.

To the accomplishment of the foregoing and such other objects as may hereinafter appear the invention consists in the features hereinafter particularly described and then sought to be clearly defined by the claims, reference being had to the accompanying drawing forming a part hereof, and in which—

Figure 1 is a side view of the tool showing the hook end engaging a post and the setting block bearing against one face thereof;

Figure 2 is a view looking at the front of Figure 1;

Figure 3 is a sectional view on the line 3—3 of Figure 2, looking in the direction of the arrows;

Figure 4 is a cross section through the claw of the hook on which the fulcruming stud or spur is formed.

In the drawing the numeral 1 designates a lever bar having one end tapered or chiseled as shown at 2 so that the bar can be used as a crow-bar. The other end of the bar is formed with a hook 3 adapted to grip a post or other object and having its end formed with a bifurcated claw 4 which adapts the tool for use in extracting nails or spikes. The claw is formed near one edge with a stud or spur 5 formed integrally or otherwise as a part thereof and adapted to penetrate a post or joist about which the hook may be passed so as to form a fulcrum for the lever bar, the spur being placed near one edge so as to permit the bar to stand at an angle or obliquely to the direction in which pressure will be applied to the bar as illustrated in the drawing, thus insuring greater leverage to the lever bar. A setting block 6 is loosely mounted on the bar and may be brought into position to bear against the edge of a piece of flooring or sheathing so that when thus engaged and the stud of the hook claw is anchored in a post or joist and pressure applied to the lever bar the block will force two pieces of flooring or sheathing together and a tight joint made between the same. The tool as a whole is well adapted to the uses which a "wrecking" tool is usually employed, and also serves for setting pieces of flooring, drop-siding, and sheathing and for the latter use is exceptionally well adapted because of the increased leverage afforded by positioning the fulcrum stud or spur as described.

The preferred features of construction of the bar have been described in detail but some of the features or changes therein may be made and essential features be retained.

Having described my invention and set forth its merits what I claim is:

1. A wrecking tool comprising a bar formed with a hook at one end and a fulcrum stud or spur on the inside of the hook adjacent one edge thereof between the bend and point of the hook.

2. A wrecking tool comprising a bar formed with a hook at one end provided with a fulcrum stud or spur on the inside of the hook adjacent one edge thereof between the bifurcated claw and bend in the hook, and a setting-block mounted on the bar for cooperation with the hook of the bar.

In testimony whereof I affix my signature in presence of two witnesses.

ALBERT ASPER.

Witnesses:
CHAS. S. HYER,
WM. G. HENDERSON.